US011326924B2

(12) United States Patent
Rhee

(10) Patent No.: US 11,326,924 B2
(45) Date of Patent: May 10, 2022

(54) DEVICE FOR MEASURING WATER LEVEL BY USING CAPACITIVE TECHNIQUE, AND METHOD THEREFOR

(71) Applicant: Korea Institute of Civil Engineering and Building Technology, Goyang-si (KR)

(72) Inventor: Dong Sop Rhee, Paju-si (KR)

(73) Assignee: Korea Institute of Civil Engineering and Building Technology, Goyang-si (KR)

(*) Notice: Subject to any disclaimer, the term of this patent is extended or adjusted under 35 U.S.C. 154(b) by 25 days.

(21) Appl. No.: 17/257,308

(22) PCT Filed: Mar. 26, 2020

(86) PCT No.: PCT/KR2020/004114
§ 371 (c)(1),
(2) Date: Dec. 31, 2020

(87) PCT Pub. No.: WO2020/204462
PCT Pub. Date: Oct. 8, 2020

(65) Prior Publication Data
US 2021/0231482 A1    Jul. 29, 2021

(30) Foreign Application Priority Data
Mar. 29, 2019    (KR) .................. 10-2019-0036758

(51) Int. Cl.
*G01F 23/263*    (2022.01)
(52) U.S. Cl.
CPC ................ *G01F 23/266* (2013.01)

(58) Field of Classification Search
CPC .... G01F 23/266; G01F 23/268; G01F 23/263; G01F 13/006
See application file for complete search history.

(56) References Cited

U.S. PATENT DOCUMENTS

2016/0041021 A1* 2/2016 Saitou .................. G01F 23/268
73/304 C

FOREIGN PATENT DOCUMENTS

| CN | 1510402 | 7/2004 |
| JP | 2003-057093 | 2/2003 |
| JP | 2007042332 A * | 2/2007 |

(Continued)

OTHER PUBLICATIONS

International Search Report and Written Opinion Dated Jul. 2, 2020 From the International Searching Authority Re. Application No. PCT/KR2020/004114 and Its Translation of Search Report Into English. (9 Pages).

*Primary Examiner* — John Fitzgerald
*Assistant Examiner* — Truong D Phan

(57) ABSTRACT

Disclosed in one embodiment are a device for measuring water level by using a capacitive technique, and a method therefor. A device for measuring water level comprises: an electrode unit which includes a first electrode and a second electrode arranged in parallel in a lengthwise direction, and which allow voltages to be applied to the first electrode and the second electrode; and a control unit for measuring the applied voltages, calculating the amount of reference charging time it takes to reach a second voltage from a predetermined first voltage on the basis of the measured voltages, and determining water level on the basis of the calculated reference charging time.

10 Claims, 14 Drawing Sheets

(56) References Cited

FOREIGN PATENT DOCUMENTS

| | | |
|---|---|---|
| JP | 2013-178219 | 9/2013 |
| KR | 10-2011-0121112 | 11/2011 |
| KR | 10-2015-0071442 | 6/2015 |
| KR | 10-2057192 | 1/2020 |
| WO | WO 2020/204462 | 10/2020 |

* cited by examiner

DEVICE FOR MEASURING WATER LEVEL BY USING CAPACITIVE TECHNIQUE, AND METHOD THEREFOR

RELATED APPLICATIONS

This application is a National Phase of PCT Patent Application No. PCT/KR2020/004114 having International filing date of Mar. 26, 2020, which claims the benefit of priority of Korean Patent Application No. 10-2019-0036758 filed on Mar. 29, 2019. The contents of the above applications are all incorporated by reference as if fully set forth herein in their entirety.

FIELD AND BACKGROUND OF THE INVENTION

An embodiment relates to a water level measuring device, and more particularly, to a device and method for measuring a water level using a capacitive technique capable of accurately measuring the water level.

Water level gauges are instruments for measuring a water level of a reservoir, a distributing reservoir, and the like, classified into a contact type and a non-contact type, and also referred to as liquid-level meters. The contact type includes an input type, a differential pressure type, a capacitive type, a float type, and the like, and the non-contact type includes an ultrasonic type. The water level gauges are developed for the purpose of measuring a water level of a river or measuring a water level with high precision in a laboratory and thus a unit price thereof is very high, and generally do not have the function of complementing individual data.

In particular, a water level gauge using a capacitive technique is mostly composed of a circuit that measures capacitance, which is a general electrical performance index in a measuring instrument, and the precision of the capacitance measuring circuit mostly determines the performance of the water level gauge.

Accordingly, technology for increasing the precision of a capacitance measuring circuit, whose measurement principle has been known for a long time, is being developed and almost completed except for process management.

However, the problem of the capacitance measuring method is that, when the measurement is performed based on factory-calibrated values, according to a temporal change such as aging of a material applied to a sensor unit or the condition of a medium to be measured, accurate measurement values may not be obtained even when the performance of the measuring circuit is already fully guaranteed, and a measurement object is also limited to general distilled water, tap water, or the like.

Accordingly, there is a need to develop a new type of water level measuring device in which the problem of applying such a capacitance measurement technique is solved and a water level measuring network is considered.

PRIOR ART DOCUMENT (Patent Document 1) Korean Patent Laid-Open Publication No. 10-1906305

SUMMARY OF THE INVENTION

An embodiment is directed to providing a device and method for measuring a water level using a capacitive technique capable of accurately measuring the water level.

One aspect of the present invention provides a device for measuring a water level, the device including an electrode unit including a first electrode and a second electrode which are arranged side by side in a lengthwise direction and to which a voltage is applied, a comparison unit configured to measure the voltage applied to the first electrode and the second electrode and determine a time point at which the measured voltage matches a first voltage and a time point at which the measured voltage matches a second voltage, and a control unit configured to set the time point at which the measured voltage matches the first voltage as a start time point and the time point at which the measured voltage matches the second voltage as an end time point, calculate a reference charging time taken to reach the second voltage from the first voltage on the basis of the set start time point and end time point, and determine a water level on the basis of the calculated reference charging time, wherein the first electrode is made of a steel material and formed in a C-shape divided into a first part, and a second part and a third part that are formed to extend from both ends of the first part, the second electrode is formed of an electric wire and is connected to an end of each of the second part and the third part of the first electrode, and the comparison unit is implemented as a circuit configured to determine the time point at which the measured voltage matches the first voltage using a comparator and a circuit configured to determine the time point at which the measured voltage matches the second voltage using a comparator.

The first voltage may be 0.5 V and the second voltage may be 4.5 V.

The reference charging time may increase as the water level increases, and decrease as the water level decreases.

The control unit may set the time point at which the measured voltage matches the first voltage as the start time point of the reference charging time, and set the time point at which the measured voltage matches the second voltage as the end time point of the reference charging time.

The control unit may calculate the reference charging time taken to reach the second voltage from the first voltage on the basis of the determined start time point and end time point, convert the calculated reference charging time into capacitance, and determine the water level on the basis of the converted capacitance.

The electrode unit may further include connection parts configured to connect the first electrode to the second electrode and prevent the first electrode from being electrically connected to the second electrode.

At least a portion of the first electrode may be formed in a predetermined regular pattern.

Another aspect of the present invention provides a method for measuring a water level, the method including measuring a voltage applied to a first electrode and a second electrode arranged side by side in a lengthwise direction by a comparison unit, wherein the first electrode is made of a steel material and formed in a C-shape divided into a first part, and a second part and a third part that are formed to extend from both ends of the first part, and the second electrode is formed of an electric wire and connected to an end of each of the second part and the third part of the first electrode, determining a time point at which the measured voltage matches a first voltage and a time point at which the measured voltage matches a second voltage by the comparison unit, setting the time point at which the measured voltage matches the first voltage as a start time point and the time point at which the measured voltage matches the second voltage as an end time point and calculating a reference charging time taken to reach the second voltage from the first voltage on the basis of the set start time point and end time point by a control unit, and determining a water level on the basis of the calculated reference charging time by the control unit, wherein the comparison unit is implemented as a circuit configured to determine the time point at which the measured voltage matches the first voltage using a comparator and a circuit configured to determine the time point at which the measured voltage matches the second voltage using a comparator.

In the calculating operation, the time point at which the measured voltage matches the first voltage may be set as the start time point of the reference charging time, and the time point at which the measured voltage matches the second voltage may be set as the end time point of the reference charging time.

In the calculating operation, the reference charging time taken to reach the second voltage from the first voltage may be calculated on the basis of the determined start time point and end time point, the calculated reference charging time may be converted into capacitance, and the water level may be determined on the basis of the converted capacitance.

Advantageous Effects

According to an embodiment, when a voltage is applied, a charging time taken to reach a predetermined second voltage from a predetermined first voltage is calculated, the calculated charging time is converted into capacitance, and a water level is determined on the basis of the converted capacitance, and thus the water level can be accurately measured with a simple measurement method even when an effort to increase the precision of a circuit is minimized.

According to an embodiment, manufacturing costs can be reduced by simplifying a measurement method, and the reliability of a measurement result can be improved by not being affected by a medium, even with a simple structure.

According to an embodiment, a maintenance burden can be remarkably reduced by simplifying a product configuration, so that a large amount of water level gauges can be installed, and thus, a water level measurement network can be easily configured in buildings, and reliability for submersion measurement can be improved by configuring the water level measurement network.

DESCRIPTION OF SPECIFIC EMBODIMENTS OF THE INVENTION

Figure 1:
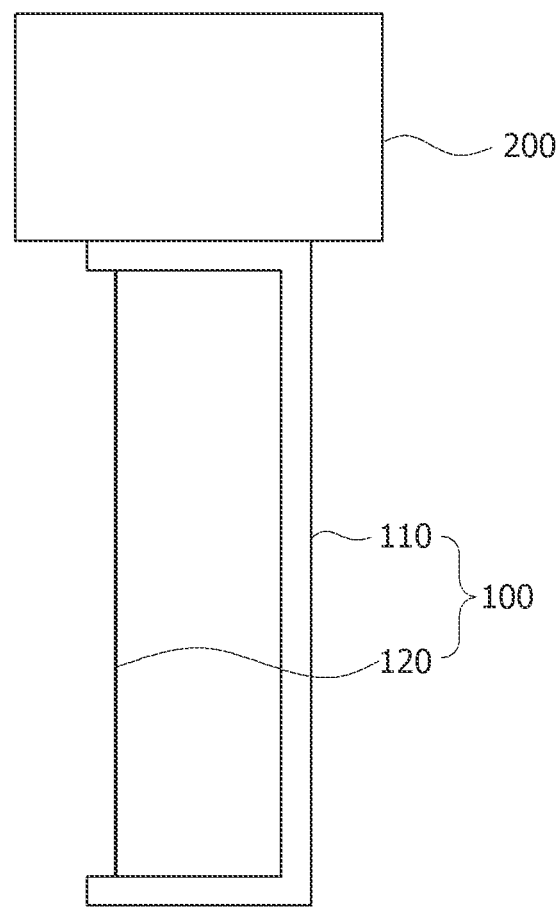
FIG. 1 is a view illustrating a device for measuring a water level according to one embodiment of the present invention.

While the present invention is susceptible to various modifications and alternative forms, particular embodiments thereof are shown by way of example in the drawings and will herein be described in detail. It should be understood, however, that there is no intent to limit the present invention to the particular forms disclosed, but on the contrary, the present invention is to cover particular modifications, equivalents, and alternatives falling within the spirit and scope of the present invention.

Although the terms "first," "second," and the like may be used herein to describe various elements, these elements should not be limited by these terms. The terms are used only for the purpose of distinguishing one element from another element. For example, without departing from the scope of the present invention, a second element could be referred to as a first element, and, similarly, a first element may also be referred to as a second element. The term "and/or" includes any one or all combinations of a plurality of associated listed items.

It should be understood that when an element is referred to as being "connected" or "coupled" to another element, it may be directly connected or coupled to the other element or intervening elements may be present. In contrast, when an element is referred to as being "directly connected," or "directly coupled" to another element, it should be understood that still another element may not be present between the element and another element.

The terms used herein are for the purpose of describing particular exemplary embodiments only and are not intended to be limiting to the present invention. As used herein, singular forms are intended to include plural forms as well, unless the context clearly indicates otherwise. In the present application, it will be further understood that the terms "comprise," "comprising," "include," and/or "including", when used in this specification, specify the presence of stated features, integers, steps, operations, elements, components and/or groups thereof but do not preclude the presence or addition of one or more other features, integers, steps, operations, elements, components and/or groups thereof.

Unless otherwise defined, all terms used herein, including technical and scientific terms, have the same meaning as commonly understood by one of ordinary skill in the art to which the present invention belongs. Terms, such as those defined in commonly used dictionaries, should be interpreted as having a meaning that is consistent with their meaning in the context of the relevant art and will not be interpreted in an idealized or overly formal sense unless clearly defined in the present application.

Hereinafter, embodiments will be described below in detail with reference to the accompanying drawings, but equal or corresponding elements will be given the same reference numerals regardless of drawing number, and redundant descriptions thereof will be omitted.

In the embodiment, a new method is proposed in which, when a voltage is applied, a charging time taken to reach a predetermined second voltage from a predetermined first voltage is calculated, the calculated charging time is converted into capacitance, and a water level is determined on the basis of the converted capacitance.

FIG. 1 is a view illustrating a device for measuring a water level according to one embodiment of the present invention.

Referring to FIG. 1, the device for measuring a water level according to one embodiment of the present invention may include an electrode unit 100 and a measuring device 200.

The electrode unit 100 may include a pair of electrodes 110 and 120 arranged in a lengthwise direction.

The pair of electrodes 110 and 120 are formed to be arranged side by side in the lengthwise direction and may include a first electrode 110 connected to a negative power source and a second electrode 120 connected to a positive power source or the first electrode 110 connected to a positive power source and the second electrode 120 connected to a negative power source.

The first electrode 110 and the second electrode 120 are arranged side by side in the lengthwise direction to be spaced apart from each other by a predetermined distance to form a capacitor capable of obtaining capacitance. Here, at least a portion of each of the first electrode 110 and the second electrode 120 remains submerged in water, and capacitance may vary depending on the level of the submerged water, that is, a length of the submerged portion.

The measuring device 200 may be connected to the pair of electrodes 110 and 120, and may measure a voltage applied to the pair of electrodes 110 and 120, and calculate a charging time on the basis of the measured voltage.

For example, the measuring device 200 may determine a start time point at which the measured voltage matches a first voltage set as a lower reference voltage, and an end time point at which the measured voltage matches a second voltage set as an upper reference voltage. Here, the first voltage and the second voltage may be set as predetermined threshold voltages, for example, the first voltage may be set as 0.5 V, and the second voltage may be set as 4.5 V. In this case, the first voltage of 0.5 V, which is the lower reference voltage, and the second voltage of 4.5 V, which is the upper reference voltage, are described by way of example, but are not necessarily limited thereto, and may be changed as needed.

The measuring device 200 may calculate a reference charging time on the basis of the determined start time point and end time point, convert the calculated reference charging time into capacitance, and determine a water level of an object to be measured on the basis of the converted capacitance.

Figure 2A:
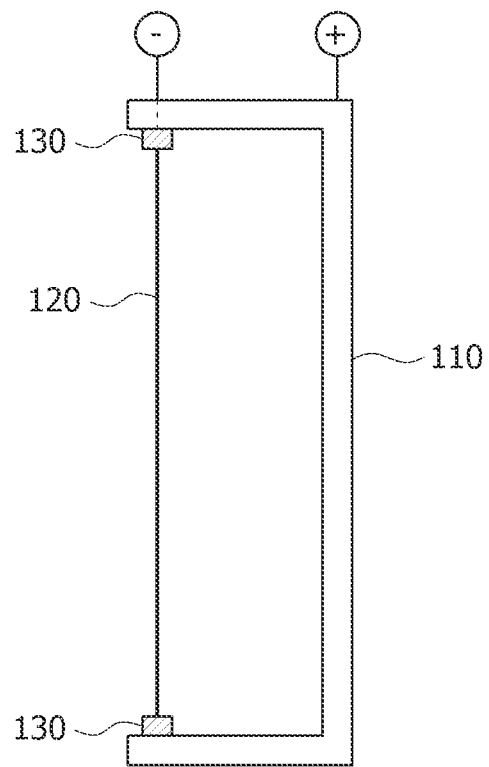
FIGS. 2A and 2B are views illustrating a first shape of an electrode unit shown in FIG. 1.
Figure 2B:
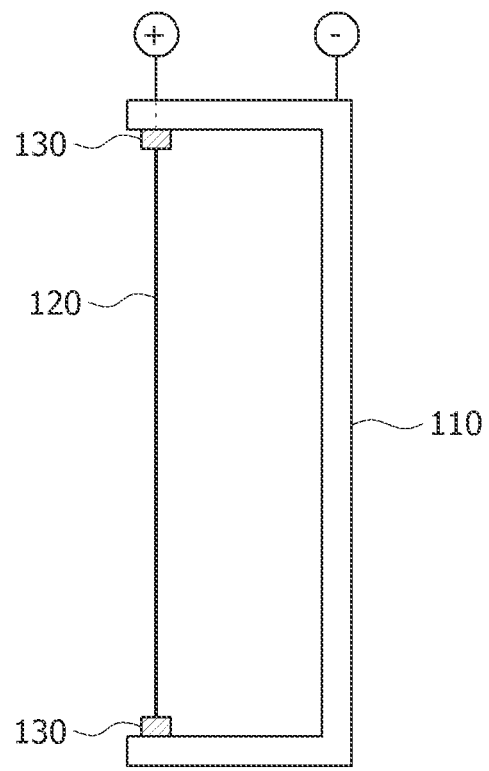

FIGS. 2A and 2B are views illustrating a first shape of the electrode unit shown in FIG. 1.

Referring to FIGS. 2A and 2B, in the electrode unit according to one embodiment of the present invention, the pair of first and second electrodes 110 and 120 may be arranged side by side in the lengthwise direction to be spaced apart from each other by a predetermined distance.

The first electrode 110 may be formed of a C-shaped electrode. The first electrode 110 may be formed of an electrode that is made of an uncoated steel material to withstand fluid pressure, for example, a stainless or alloy material to prevent rust caused by being in contact with water.

The second electrode 120 is connected to both ends of the first electrode 110 and may be formed of an electric wire that is not covered with an insulating material. For example, a conductor such as copper, aluminum, silver, or the like may be used as a material for the electric wire.

Here, when the second electrode 120 is directly connected to both ends of the first electrode 110, a short circuit may occur, so that connection parts 130 made of a material through which current does not flow may be provided and connected to the both ends of the first electrode 110. The connection parts 130 may be made of, for example, a plastic material.

Further, the first electrode 110 is divided into a first part facing the second electrode 120, and a second part and a third part respectively extending from both ends of the first part, and the first part may be made of a steel material and the second and third parts may be made of a material other than a steel material.

Further, as shown in FIG. 2A, a positive power source may be connected to the first electrode 110, and a negative power source may be connected to the second electrode 120, but in contrast, as shown in FIG. 2B, the negative power source may be connected to the first electrode 110 and the positive power source may be connected to the second electrode 120.

Figure 3A:
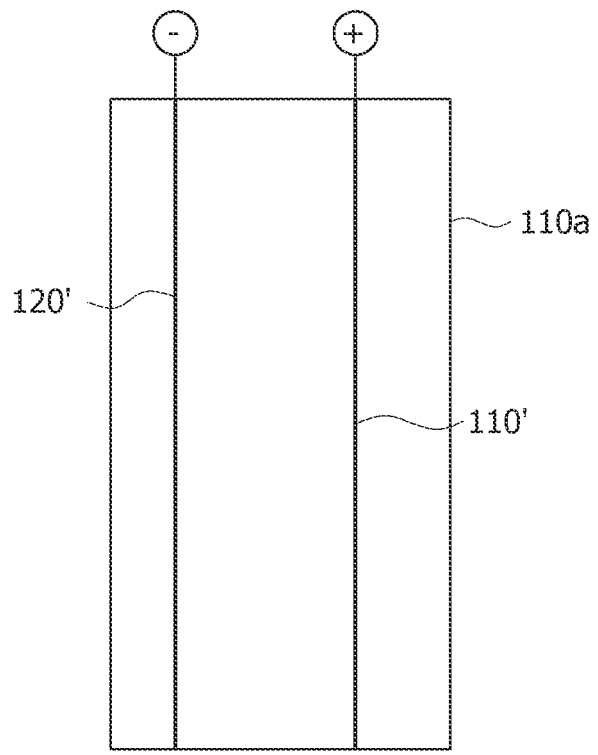
FIGS. 3A and 3B are views illustrating a second shape of the electrode unit shown in FIG. 1.
Figure 3B:
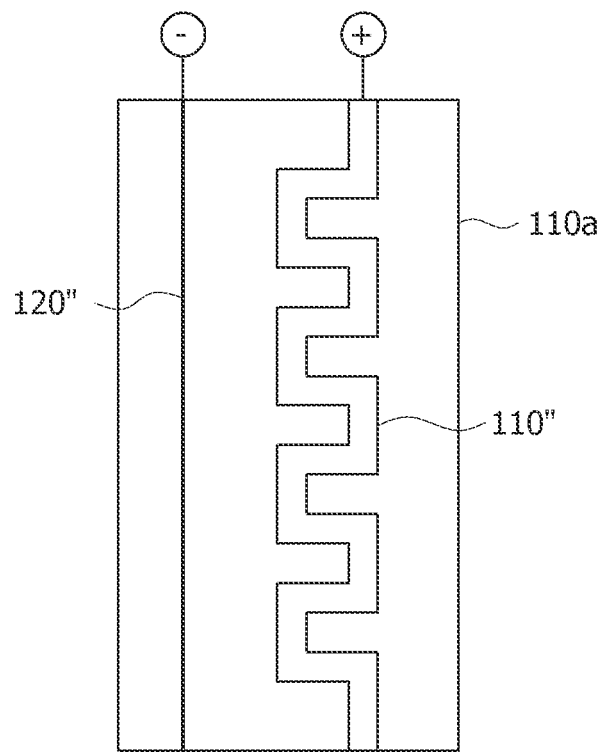

FIGS. 3A and 3B are views illustrating a second shape of the electrode unit shown in FIG. 1.

Referring to FIGS. 3A and 3B, in an electrode unit according to one embodiment of the present invention, a pair of a first electrode 110' or 110" and a second electrode 120' or 120" may be disposed above a base film 100a to be side by side in the lengthwise direction.

In this case, for example, a Teflon film may be used as the base film 100a.

Here, the first electrode 110' or 110" and the second electrode 120' or 120" may be formed in the same shape or different shapes.

As an example, referring to FIG. 3A, the first electrode 110' and the second electrode 120' may be formed in the same shape. The first electrode 110' and the second electrode 120' may be formed of electric wires.

As another example, referring to FIG. 3B, the first electrode 110" and the second electrode 120" may be formed in different shapes. At least a portion of the first electrode 110" may be formed in a predetermined pattern. In this case, the predetermined pattern may be a regularly formed pattern. Such a predetermined pattern may increase a bandwidth of the capacitance, so that the accuracy of measurement may be improved.

The first electrode 110" may be formed of an electrode made of an uncoated steel material to withstand fluid pressure, for example, a stainless or alloy material to prevent rust caused by being in contact with water.

The second electrode 120" may be formed of a thin film-shaped electric wire that is not covered with an insulating material.

Further, as shown in FIGS. 3A and 3B, a positive power source may be connected to the first electrode 110' or 110", and a negative power source may be connected to the second electrode 120' or 120", but in contrast, the negative power source may be connected to the first electrode 110' or 110" and the positive power source may be connected to the second electrode 120' or 120".

Figure 4:
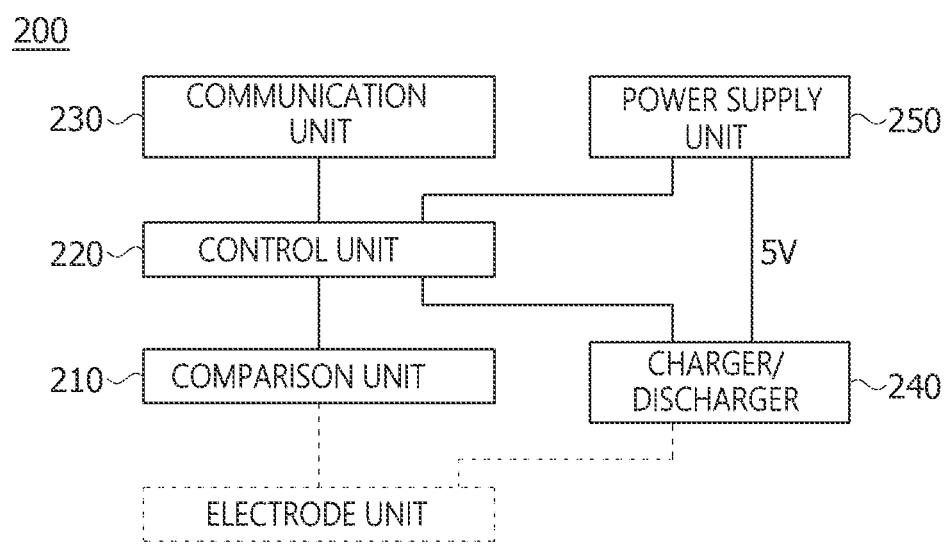
FIG. 4 is a diagram illustrating a detailed configuration of the measuring device shown in FIG. 1.
Figure 5A:
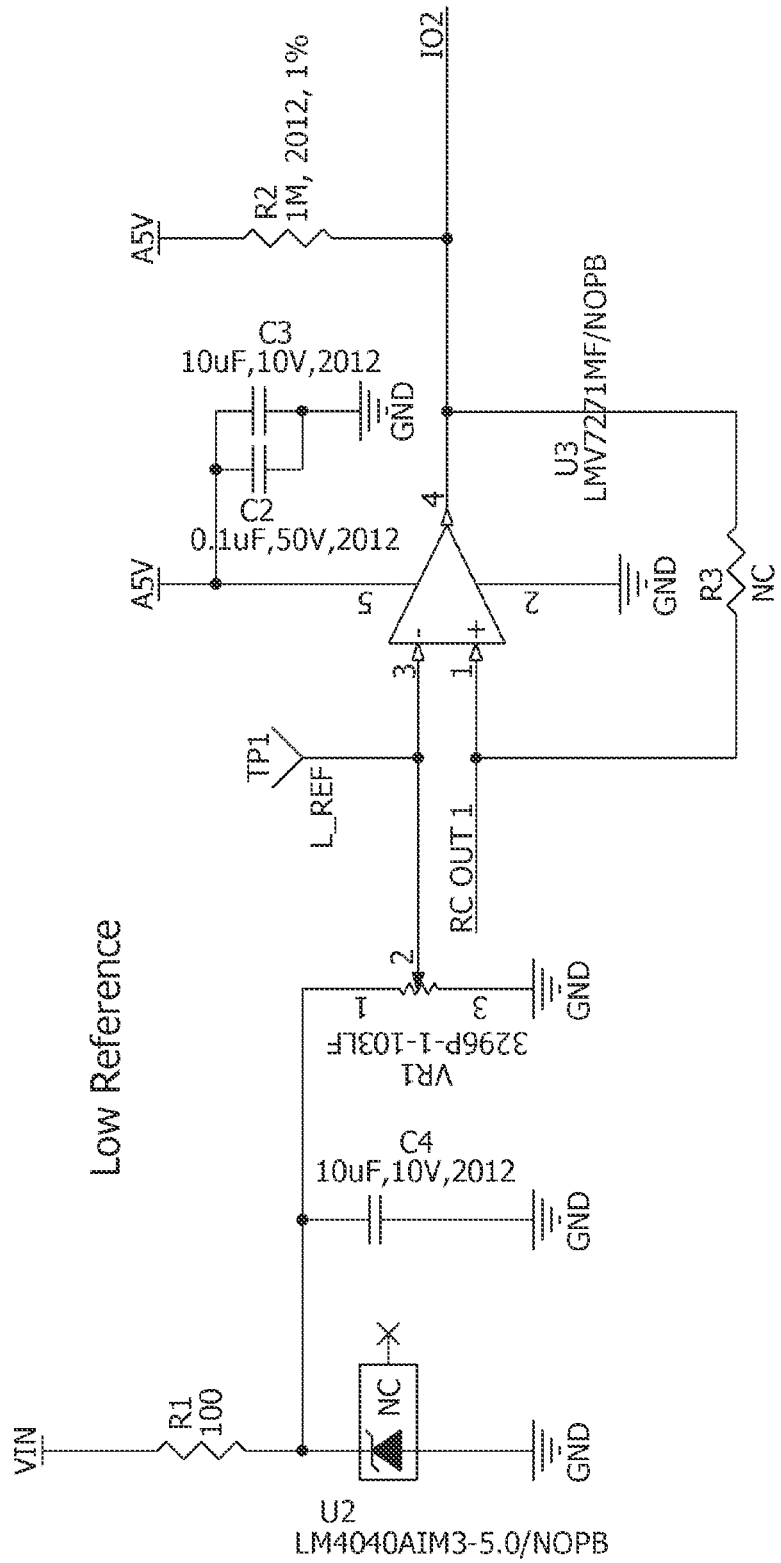
FIGS. 5A and 5B are circuit diagrams in which a comparison unit shown in FIG. 2 is implemented.
Figure 5B:
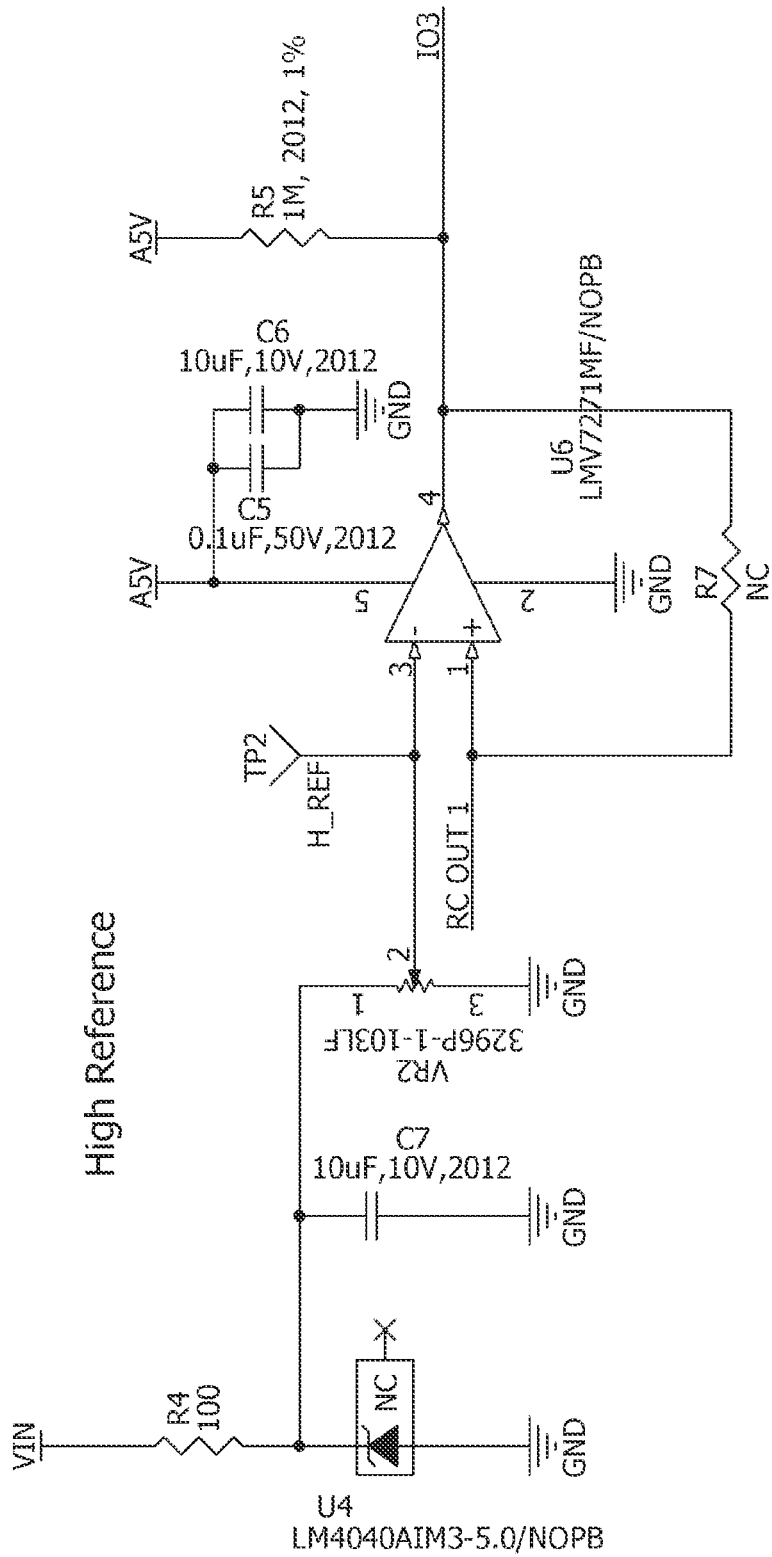
Figure 5C:
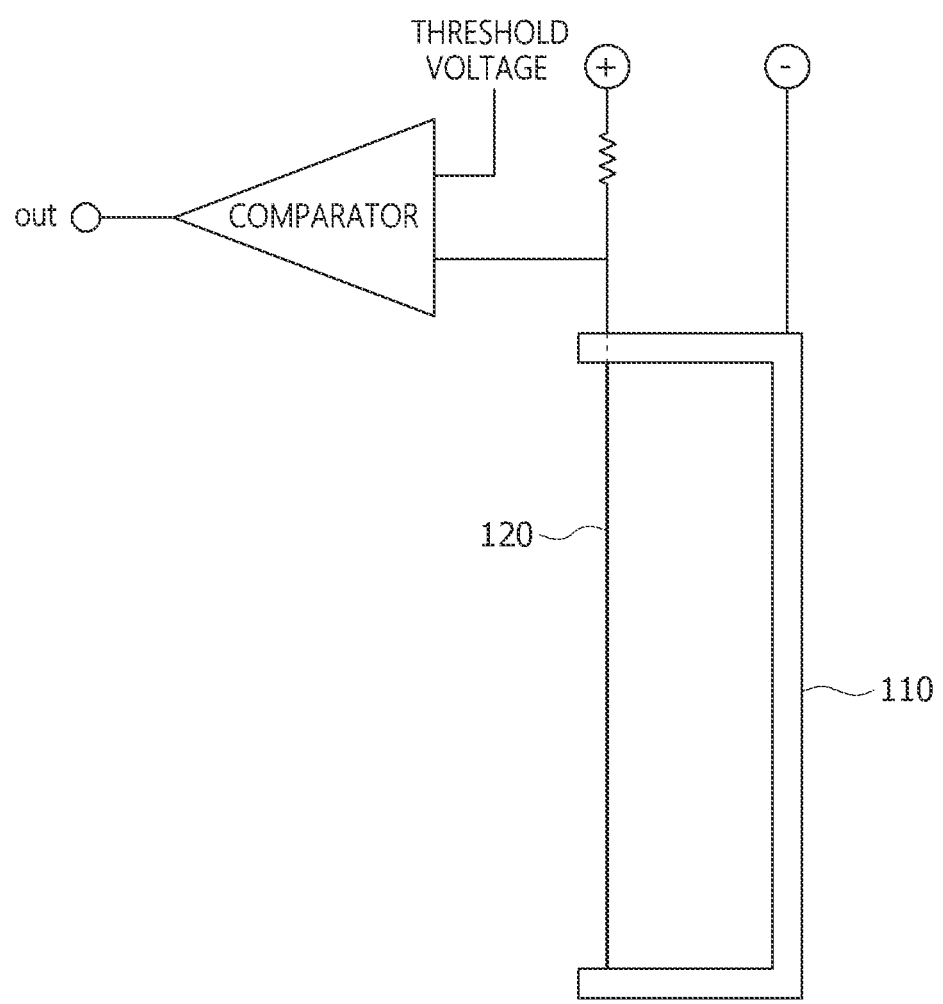
FIG. 5C is a diagram for describing the operation principle of the comparison unit.

FIG. 4 is a diagram illustrating a detailed configuration of the measuring device shown in FIG. 1, FIGS. 5A and 5B are circuit diagrams in which a comparison unit shown in FIG. 2 is implemented, and FIG. 5C is a diagram for describing the operation principle of the comparison unit.

Referring to FIG. 4, the measuring device 200 according to one embodiment of the present invention may include a comparison unit 210, a control unit 220, a communication unit 230, a charger/discharger 240, and a power supply unit 250.

The comparison unit 210 may be connected to one end of a pair of electrodes, that is, the first electrode 110 and the second electrode 120, and may measure a voltage, which is applied to the first electrode 110 and the second electrode 120, in real time.

Referring to FIGS. 5A to 5C, the comparison unit 210 may accurately determine a time point at which the measured voltage matches the first voltage and a time point at which the measured voltage matches the second voltage by measuring the voltage in real time.

Here, a circuit for determining the time point at which the measured voltage matches the first voltage and a circuit for determining the time point at which the measured voltage matches the second voltage are implemented using a comparator.

For example, the comparator may be implemented so as to output a high signal when the input voltage matches the first voltage, and in contrast, to output a low signal when the input voltage does not match the first voltage.

In more detail, when voltage is periodically measured using a voltage sensor and a charging time is calculated using the measured voltage, a time point at which the voltage is measured may not exactly coincide with the time point at which the measured voltage matches the first voltage or the time point at which the measured voltage matches the second voltage. Accordingly, when the voltage applied in real time is directly input as an input value of the comparator as in the embodiment, the time point at which the measured voltage matches the first voltage or the time point at which the measured voltage matches the second voltage may be accurately determined.

Referring to FIG. 4, the control unit 220 may calculate a reference charging time on the basis of the start time point and the end time point determined by the comparison unit 210, convert the calculated reference charging time into capacitance, and determine the water level of the object to be measured on the basis of the determined capacitance.

The communication unit 230 may wirelessly transmit the water level of the object, which is determined by the control unit 220, to an external device and receive a control signal related to the water level measurement from the external device.

The charger/discharger 240 may charge and discharge the first electrode 110 and the second electrode 120 with voltage.

The power supply unit 250 may supply power. Here, the power supply unit 250 may supply power to operate the control unit 220 as well as power allowing the electrodes to generate capacitance.

Figure 6A:
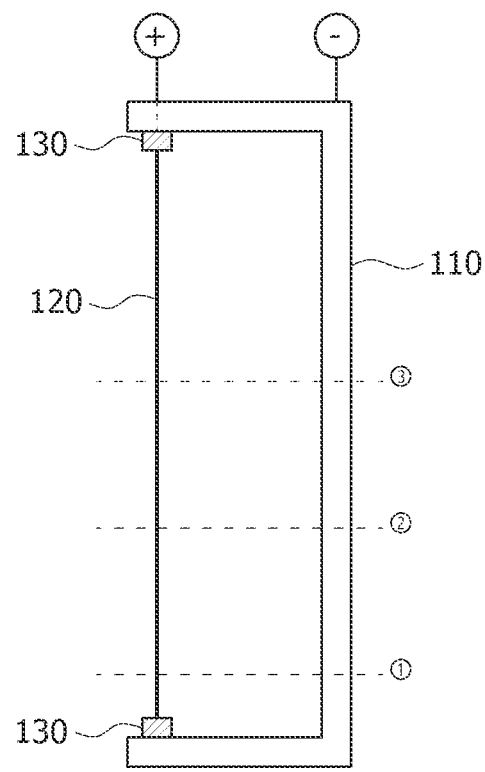
FIGS. 6A, 6B and 6C are views illustrating a change amount in capacitance according to the water level.
Figure 6B:
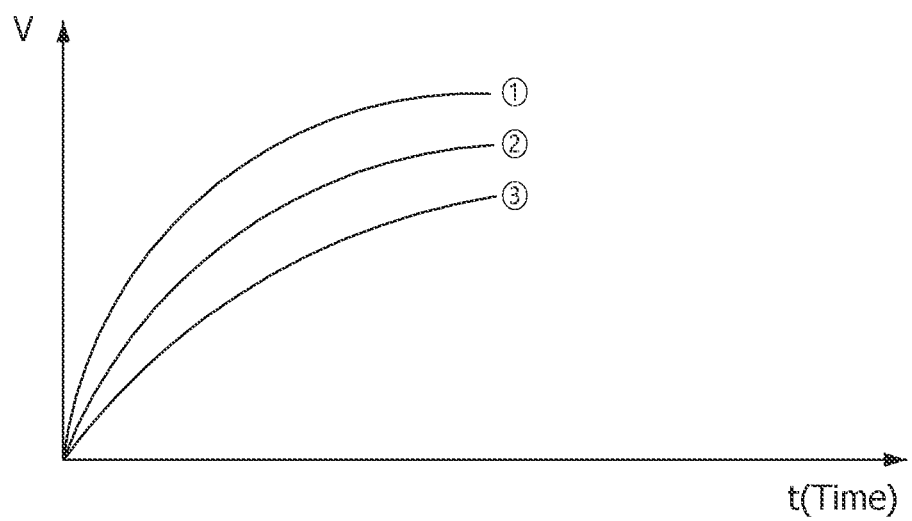
Figure 6C:
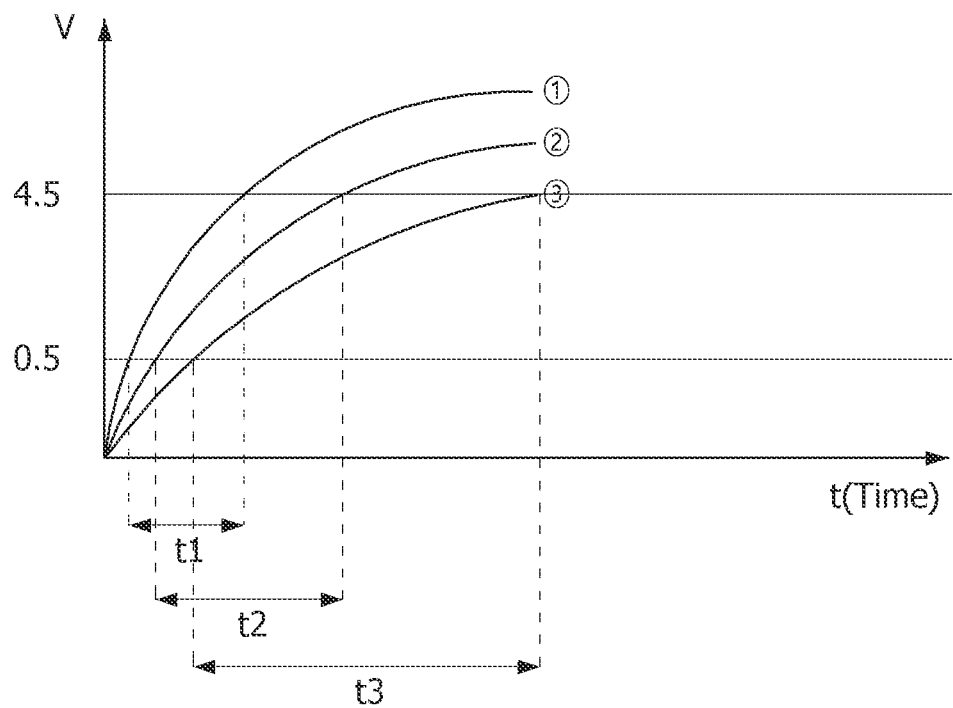

FIGS. 6A to 6C are views illustrating a change amount in capacitance according to the water level.

Referring to FIGS. 6A and 6B, in one embodiment of the present invention, the voltage obtained by measuring the voltage applied to the pair of electrodes 110 and 120 may be converted into capacitance.

Here, it can be seen that the measured capacitance is proportional to the voltage, and the degree of a voltage rise over time varies depending on degrees ①, ②, and ③ at which the pair of electrodes 110 and 120 are submerged in water.

Referring to FIG. 6C, it can be seen that, when the water level is low and thus the measured capacitance is low as in ①, the voltage rises rapidly, and the time taken to reach the upper reference voltage of 4.5V from the lower reference voltage of 0.5V is t1, which is the shortest, and when the water level is high and thus the measured capacitance is high as in ③, the voltage rises slowly, and the time taken to reach the upper reference voltage of 4.5V from the lower reference voltage of 0.5V increases to t3.

Accordingly, in the present invention, the water level may be determined based on the reference charging time, that is, the time taken to reach the predetermined upper reference voltage of 4.5V from the predetermined lower reference voltage of 0.5V. A case in which the time taken to reach 4.5V from 0.5V is determined as the reference charging time is described herein by way of example, but is not limited thereto, and may be changed as needed.

Figure 7A:
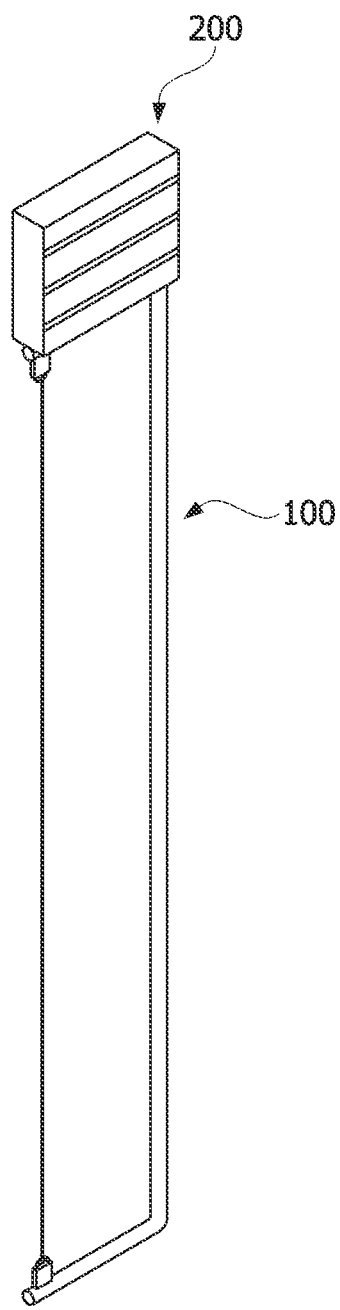
FIGS. 7A and 7B illustrate a water level measuring device that is actually implemented according to one embodiment of the present invention.
Figure 7B:
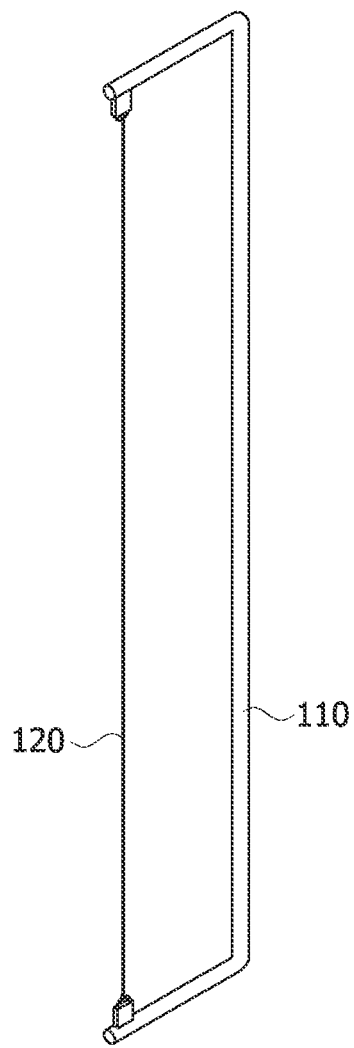

FIGS. 7A and 7B illustrate a water level measuring device that is actually implemented according to one embodiment of the present invention.

Referring to FIG. 7A, the water level measuring device that is actually implemented according to one embodiment of the present invention includes an electrode unit 100 consisting of a pair of electrodes and a measuring device 200 configured to determine a water level.

Referring to FIG. 7B, the electrode unit 100 of FIG. 7A, which is shown by being enlarged, includes a first electrode 110 formed in a C-shape and a second electrode 120 connected to both ends of the first electrode 110.

Figure 8:
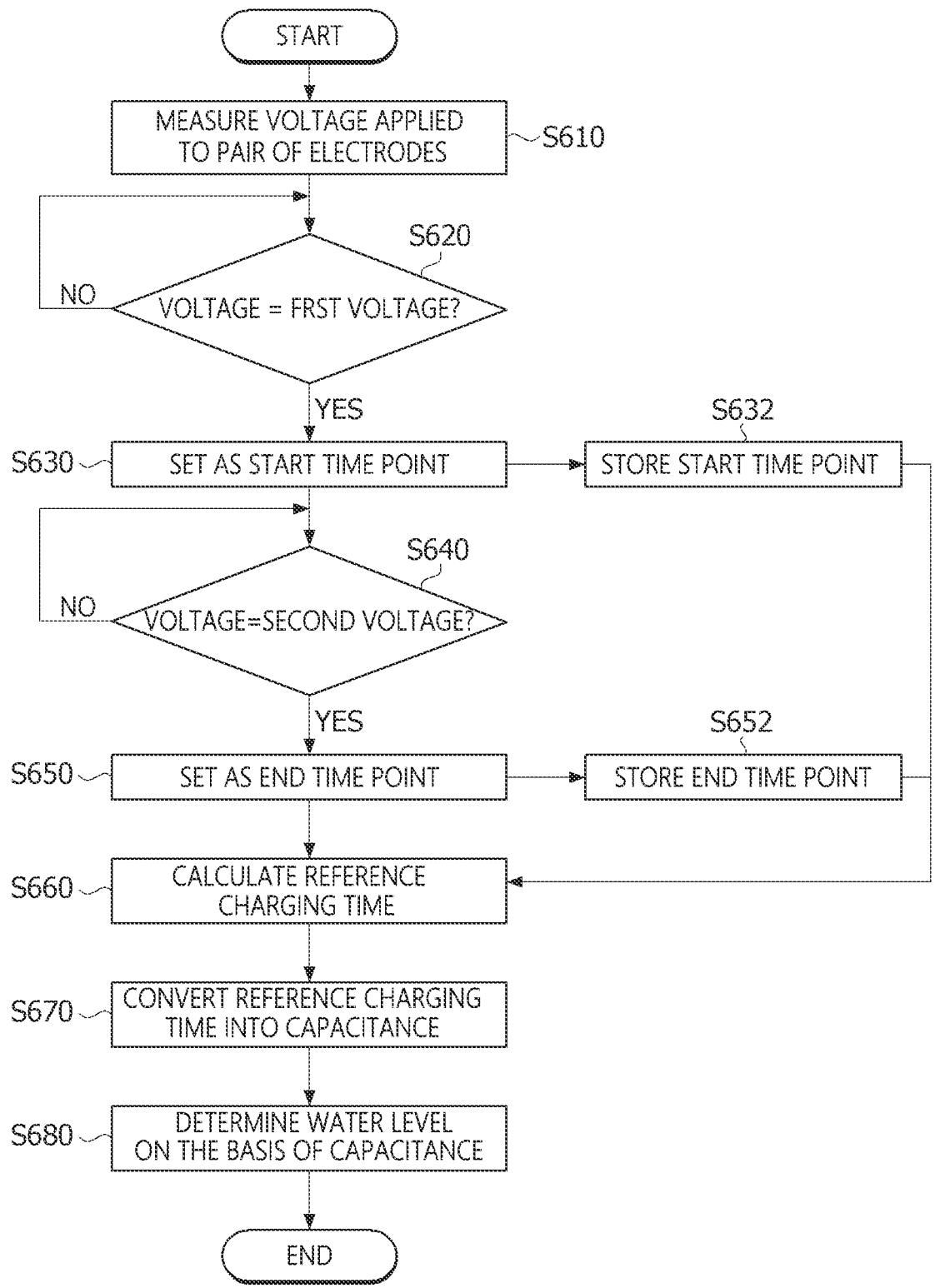
FIG. 8 is a flowchart illustrating a method for measuring a water level according to one embodiment of the present invention.

FIG. 8 is a flowchart illustrating a method for measuring a water level according to one embodiment of the present invention.

Referring to FIG. 8, when a voltage is applied to a pair of electrodes, a device for measuring a water level according to one embodiment of the present invention (hereinafter referred to as a water level measuring device) may measure the applied voltage (S610). Next, the water level measuring device may check whether the measured voltage matches a first voltage set as a lower reference voltage (S620). When the measured voltage matches the first voltage, the water level measuring device may set a time point at which the measured voltage matches the first voltage as a start time point of a reference charging time (S630).

At this point, the water level measuring device may store the set start time point (S632).

Next, the water level measuring device may check whether the measured voltage matches a second voltage set as an upper reference voltage (S640). When the measured voltage matches the second voltage, the water level measuring device may set a time point at which the measured voltage mates the second voltage as an end time point of the reference charging time (S650).

At this point, the water level measuring device may store the set end time point (S652).

Next, the water level measuring device may calculate the reference charging time taken to reach the second voltage from the first voltage on the basis of the set start and end time points (S660).

Next, the water level measuring device may convert the calculated reference charging time into capacitance (S670).

Next, the water level measuring device may determine a water level on the basis of the converted capacitance (S680). Thereafter, the water level measuring device may transmit information on the water level of an object to be measured, which is determined as described above, to an external device so that a manager can check the water level information through the device.

Next, the water level measuring device may completely discharge the voltage charged in the pair of electrodes. The reason for discharging the charged voltage is to measure the water level again later.

The term "unit" used herein refers to software, a field-programmable gate array (FPGA), or a hardware component such as an application-specific integrated circuit (ASIC), and the "unit" performs certain functions. However, the "unit" is not limited to the software or hardware. The "unit"

may be configured to reside on an addressable storage medium or may be configured to run one or more processors. Therefore, the "unit" may include, for example, components (such as software components, object-oriented software components, class components, and task components), processes, functions, attributes, procedures, subroutines, segments of program code, drivers, firmware, microcodes, circuitry, data, databases, data structures, tables, arrays, and variables. Functions provided in components and "units" may be combined with a smaller number of components and "units," or may be further divided into additional components and "units." Furthermore, the components and "units" may be implemented to run one or more CPUs in a device or a secure multimedia card.

Although the exemplary embodiments of the present invention have been described above, it may be understood by those skilled in the art that a variety of modifications and changes may be made without departing from the concept and scope of the present invention disclosed within the range of the following claims.

DESCRIPTION OF REFERENCE NUMERALS

100: electrode unit
110: first electrode
120: second electrode
130: connection part
200: measuring device
210: comparison unit
220: control unit
230: communication unit
240: charger/discharger
250: power supply unit

What is claimed is:

1. A device for measuring a water level, the device comprising:
    an electrode unit including a first electrode and a second electrode which are arranged side by side in a lengthwise direction and to which a voltage is applied;
    a comparison unit configured to measure the voltage applied to the first electrode and the second electrode and determine a time point at which the measured voltage matches a first voltage and a time point at which the measured voltage matches a second voltage; and
    a control unit configured to set the time point at which the measured voltage matches the first voltage as a start time point and the time point at which the measured voltage matches the second voltage as an end time point, calculate a reference charging time taken to reach the second voltage from the first voltage on the basis of the set start time point and end time point, and determine a water level on the basis of the calculated reference charging time,
    wherein the first electrode is made of a steel material and formed in a C-shape divided into a first part, and a second part and a third part that are formed to extend from both ends of the first part,
    the second electrode is formed of an electric wire and is connected to an end of each of the second part and the third part of the first electrode, and
    the comparison unit is implemented as a circuit configured to determine the time point at which the measured voltage matches the first voltage using a comparator and a circuit configured to determine the time point at which the measured voltage matches the second voltage using a comparator.

2. The device of claim 1, wherein the first voltage is 0.5 V and the second voltage is 4.5 V.

3. The device of claim 1, wherein the reference charging time increases as the water level increases, and decreases as the water level decreases.

4. The device of claim 1, wherein the electrode unit further includes connection parts configured to connect the first electrode to the second electrode and prevent the first electrode from being electrically connected to the second electrode.

5. The device of claim 1, wherein at least a portion of the first electrode is formed in a predetermined regular pattern.

6. The device of claim 1, wherein the control unit sets the time point at which the measured voltage matches the first voltage as the start time point of the reference charging time, and sets the time point at which the measured voltage matches the second voltage as the end time point of the reference charging time.

7. The device of claim 6, wherein the control unit converts the calculated reference charging time into capacitance, and determines the water level on the basis of the converted capacitance.

8. A method for measuring a water level, the method comprising:
    measuring a voltage applied to a first electrode and a second electrode arranged side by side in a lengthwise direction by a comparison unit, wherein the first electrode is made of a steel material and formed in a C-shape divided into a first part, and a second part and a third part that are formed to extend from both ends of the first part, and the second electrode is formed of an electric wire and connected to an end of each of the second part and the third part of the first electrode;
    determining a time point at which the measured voltage matches a first voltage and a time point at which the measured voltage matches a second voltage by the comparison unit;
    setting the time point at which the measured voltage matches the first voltage as a start time point and the time point at which the measured voltage matches the second voltage as an end time point, and calculating a reference charging time taken to reach the second voltage from the first voltage on the basis of the set start time point and end time point by a control unit; and
    determining a water level on the basis of the calculated reference charging time by the control unit,
    wherein the comparison unit is implemented as a circuit configured to determine the time point at which the measured voltage matches the first voltage using a comparator and a circuit configured to determine the time point at which the measured voltage matches the second voltage using a comparator.

9. The method of claim 8, wherein in the calculating operation,
    the time point at which the measured voltage matches the first voltage is set as the start time point of the reference charging time, and
    the time point at which the measured voltage matches the second voltage is set as the end time point of the reference charging time.

10. The method of claim 9, wherein in the calculating operation,
    the calculated reference charging time is converted into capacitance, and the water level is determined on the basis of the converted capacitance.

* * * * *